United States Patent [19]

Bear

[11] Patent Number: 5,452,944
[45] Date of Patent: Sep. 26, 1995

[54] DEVICE FOR ADHERING LUG NUTS TO VEHICLE WHEELS

[76] Inventor: Richard W. Bear, 4270 Witherow Rd., Winston-Salem, N.C. 27106

[21] Appl. No.: 270,669

[22] Filed: Jul. 5, 1994

[51] Int. Cl.⁶ ........................................................ B60B 3/16
[52] U.S. Cl. ........................ 301/35.62; 301/111; 411/533; 411/544; 411/999
[58] Field of Search ....................... 301/35.62, 111; 411/372, 533, 542, 544, 999, 165, 258

[56] References Cited

U.S. PATENT DOCUMENTS

| | | | |
|---|---|---|---|
| 1,997,821 | 4/1935 | Gzupkaytie | 301/35.62 |
| 2,576,906 | 11/1951 | Poupitch. | |
| 2,679,880 | 6/1954 | Poupitch. | |
| 2,775,917 | 1/1957 | Ferguson. | |
| 3,829,163 | 8/1974 | Hans. | |
| 5,042,880 | 8/1991 | Garuti et al. | 301/35.62 |
| 5,051,049 | 9/1991 | Wills. | |
| 5,281,065 | 1/1994 | Wu | 411/542 X |
| 5,314,280 | 5/1994 | Gagliardi et al. | 411/258 X |

Primary Examiner—Russell D. Stormer
Attorney, Agent, or Firm—Shefte, Pinckney & Sawyer

[57] ABSTRACT

Lug nuts may be adhered to a vehicle wheel about a stud-receiving opening therein to facilitate mounting of the wheel onto a wheel hub of a vehicle without necessitating manual placement of the lug nut on the stud by utilizing a cylindrical washer-like annular device, the opposite ends of which have self-adhesive surfaces. Thus, one adhesive surface of the washer-like device may be adhered to the vehicle wheel about a stud-receiving opening while the opposite adhesive surface may be adhered to the lug nut. The main body of the device is preferably formed of a stretchable foam material so that the device is extensible in response to extension of the stud through the wheel opening, thereby to remain adhered to the wheel and the lug nut until securement of the lug nut to the stud.

12 Claims, 1 Drawing Sheet

5,452,944

DEVICE FOR ADHERING LUG NUTS TO VEHICLE WHEELS

BACKGROUND OF THE INVENTION

The present invention relates generally to vehicle wheels, especially wheels of the type equipped with a plurality of openings for receiving studs of a wheel hub when mounted to a vehicle, and relates more particularly to a device of the aforementioned type specifically adapted for use with wheels of racing automobiles to facilitate rapid exchange of tires during an automobile race.

Over the years, the technology and engineering of racing automobiles has advanced dramatically to the point that only very fine mechanical and structural differences distinguish one racing automobile from another. Thus, at the ever increasing speeds at which racing automobiles travel, the skill of the driver and his supporting crew as well as tactics and strategy play a greater role in determining the outcome of races. It is not uncommon that only a matter of seconds, or even fractions of a second, separate differing automobiles in the final finishing placement of a race. Accordingly, considerable effort is devoted to time-saving techniques, especially to minimize the amount of time required during pit stops which are always necessary during virtually any race.

One particularly time-consuming procedure which must be carried out during pit stops, at least in the course of races of greater lengths, is the exchange of fresh new racing tires for worn tires. In stock car racing particularly, the wheel hubs of an automobile are characteristically equipped with multiple mounting studs which must project through a corresponding plurality of openings in the wheels which mount the automobile tires and receive lug nuts to firmly secure the wheels to the hubs. The time required to align the openings of each wheel with the studs of the corresponding wheel hub, mount the wheel to the hub, and then secure the lug nuts to the studs can conceivably make the difference in the outcome of a given race if the operation consumes too much time or if one automobile's crew is more efficient at the operation than the crew of a competing automobile. Indeed, wheel exchange operations are actually practiced by pit crews to best minimize the amount of time consumed.

One technique which has evolved in recent years to simplify and shorten tire exchange operations is to actually adhere lug nuts over the openings in a racing automobile's spare wheels preparatory to a race so that, during a tire exchange, the pit crew is not required to manually place the lug nuts on the studs of the wheel hub. Typically, a caulking-type adhesive is utilized to adhere the lug nuts in place on the spare wheels and, hence, while this technique satisfactorily accomplishes the intended purpose of promoting more rapid exchange of tires during pit stops, the technique suffers the disadvantages that this preparatory operation is extremely time consuming, both in the application of the caulking adhesive and in the time required for the adhesive to set up sufficiently to hold the lug nuts securely in place, and also leaves a messy residue of adhesive on the wheels and the lug nuts at the conclusion of a race, which is additionally time consuming to clean. Moreover, given the time required for the caulking adhesive to set up, it is generally not possible to use this mounting technique on short notice, for example, when unanticipated tire changes become necessary during a race.

U.S. Pat. No. 3,829,163 discloses a quick change wheel assembly by which lug nuts are similarly pre-adhered to a replacement wheel utilizing an auxiliary sleeve disposed between each adhered lug nut and the wheel. This patent discloses the preferred use of a weak glue such as a weak thermo-setting glue, which will separate when axial forces are applied to the lug nut. It is believed, however, that the assembly of this patent may be less desirable than the more traditional use of a caulking-like adhesive because the adhesion of the lug nuts utilizing the intermediate sleeves, would appear to be less resilient and flexible than the use of caulking-type adhesive and, therefore, would experience a greater tendency that the lug nuts and/or the sleeves could be dislodged by the studs of a wheel hub upon placement thereon.

SUMMARY OF THE INVENTION

It is accordingly an object of the present invention to provide a novel and improved means by which lug nuts may be adhered to a vehicle wheel preparatory to mounting thereof on a wheel hub, which overcomes the above-described disadvantages of the prior art. More particularly, it is an object of the present invention to provide such a lug nut adhesive means which simplifies and reduces the time required for pre-adhesion of lug nuts to a vehicle wheel and also simplifies and reduces the time required for and even eliminates subsequent cleaning of the wheel and lug nuts after use. A more specific object of the present invention is to provide a device for the aforementioned purpose which is self-adhesive and also flexible and extensible to minimize risk of being dislodged from the wheel to which it is adhered. More broadly, it is an object of the present invention to provide a device by which essentially any nut may be adhered in place about an opening in a mounting surface to facilitate the installation of a bolt or other compatible fastener.

Briefly summarized, the present invention accomplishes these objects in an embodiment specifically intended for use with lug nuts for vehicle wheels by providing a device which comprises an annular body defining an axial opening therethrough for alignment with a stud-receiving opening in a vehicle wheel. The annular body has self-adhesive surfaces at opposite ends thereof for adhesion of one end to the vehicle wheel about the stud-receiving opening and adhesion of the other end to the lug nut. The annular body is extensible, e.g., in response to extension of a stud of a vehicle wheel hub through the stud-receiving opening of the wheel, thereby to remain adhered to the wheel and to the lug nut until securement of the lug nut to the stud.

Preferably, the annular body is formed of a stretchable foam material, typically in a generally cylindrical shape with the axial opening being correspondingly cylindrical. As necessary or desirable, slits may be formed to extend radially through the body partially about its circumference to enhance its axial stretchability.

It is more fundamentally contemplated that such a device may be alternatively configured in various other embodiments to be compatible with other forms of nuts, bolts and like mating fasteners to similarly facilitate easy mounted installation thereof.

DETAILED DESCRIPTION OF THE PREFERRED EMBODIMENT

Figure 1:
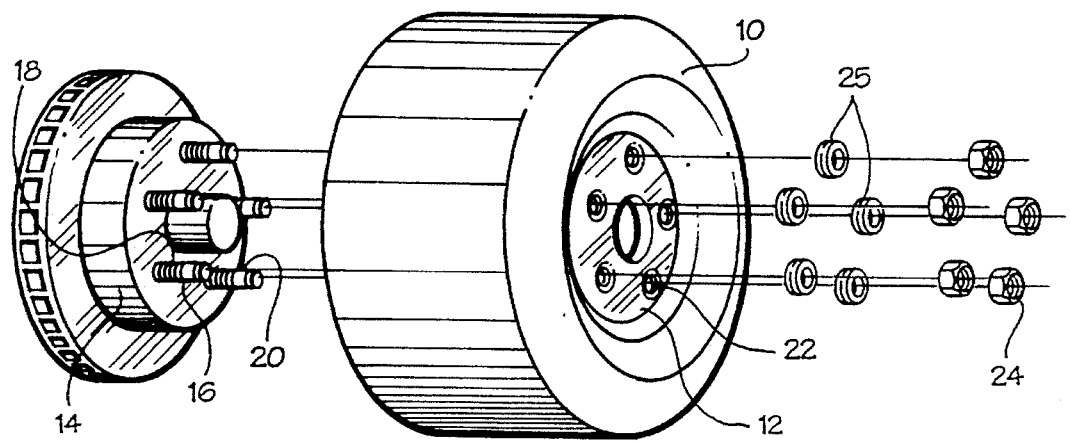
FIG. 1 is an exploded perspective view depicting the adhesive attachment of lug nuts to a typical automobile wheel utilizing devices in accordance with the preferred embodiment of the present invention and, in turn, depicting the mounting of such wheel on a wheel hub of an automobile.
Figure 2:
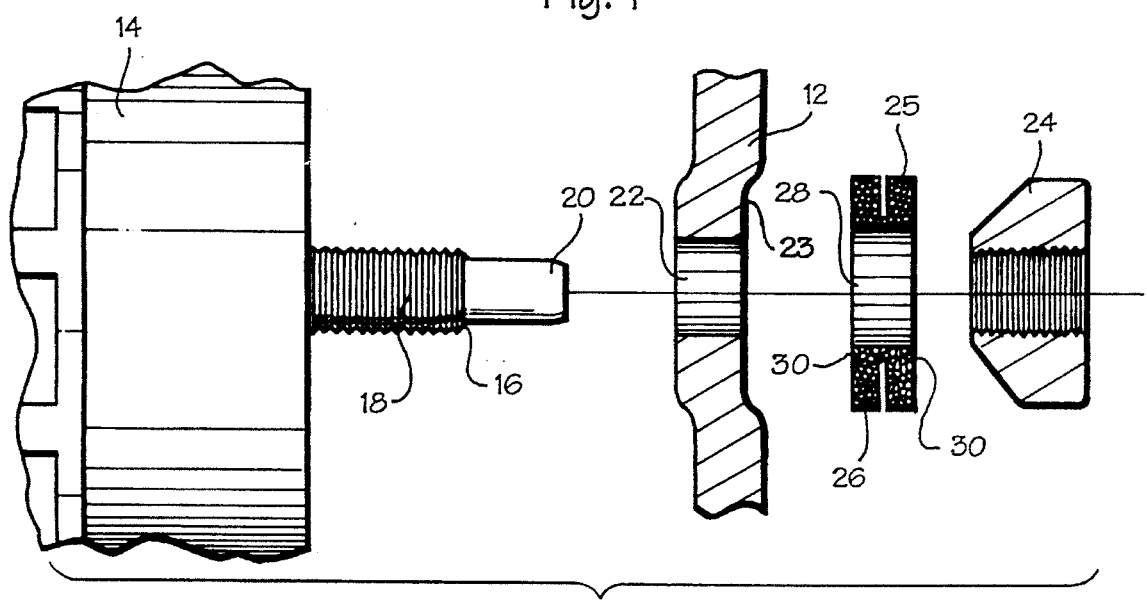
FIG. 2 is a cross-sectional view of the wheel hub, wheel, adhesive device, and lug nut of FIG. 1, taken along line 2-2 thereof.

Referring now to the accompanying drawings and initially to FIG. 1, a typical vehicle tire 10 mounted on a wheel 12 is shown in exploded relation to a vehicle wheel hub 14 on which the wheel 12 would be mounted. The wheel hub 14 has a plurality of studs 16 rigidly fixed to and extending axially outward from a radial face of the hub 14 in uniformly spaced relation concentric to the rotational axis of the hub 14. Each stud 16 is of the type currently in conventional use on most modern racing stock cars, having a threaded shank 18 and a very slightly reduced diameter "bullet"-shaped nose portion 20 at the outer free end of the stud 16. The vehicle wheel 12 is formed with a concentric arrangement of spaced openings 22 axially through the wheel 12 for receiving the studs 16 when the tire and wheel assembly 10,12 is mounted on the hub 14, the regions of the wheel 12 immediately surrounding each opening 22 typically being slightly recessed as shown at 23. A corresponding number of conventional lug nuts 24, internally threaded in correspondence to the threaded shank 18 of the studs 16, are provided for securing the wheel 12 rigidly to the wheel hub 14.

To the extent thus far described, the wheel hub 14, its studs 16, the wheel 12 and the lug nuts 24 are conventional. According to the present invention, a novel washer-shaped device 25 is provided for conveniently adhering each lug nut 24 to the outer face of the wheel 12 annularly about a respective stud-receiving opening 22, preparatory to mounting of the wheel and tire assembly 10,12 onto the hub 14, thereby to simplify and shorten the time required for the wheel mounting process.

Figure 3:
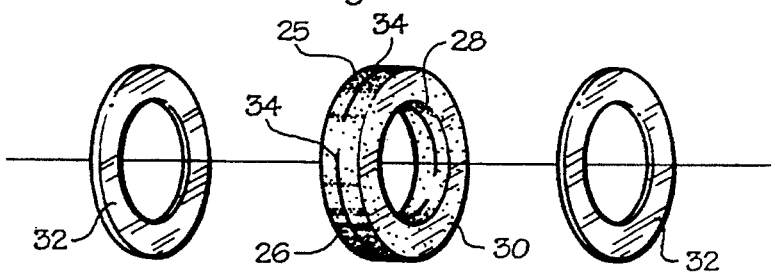
FIG. 3 is an enlarged perspective view of the adhesive device of the present invention.

More particularly, and with additional reference to FIG. 3, the adhesive washer-like devices 25 of the present invention basically comprise an annular body 26 of a substantially cylindrical shape having a concentric cylindrical opening 28 formed completely therethrough between opposite radial end faces 30. A relatively thin film of a self-adhesive material, preferably a pressure sensitive adhesive, is bonded to each opposite end face 30 of the annular body 26, with the self-adhesive material being protected by a peelably removable washer-shaped non-stick protective overlay 32, which may be of plastic or other suitable material. The annular body 26 of each washer-like device 25 is preferably formed of a sponge-like resiliently stretchable natural or synthetic foam material so as to be axially expansible. As necessary or desirable, two or more slits 34 may be formed at opposite sides of the annular body 26 to extend radially through the body 26 and about a portion of its annular circumference, to enhance the axial extensibility of the device 25 which better enables the opposite adhesive faces of the body to conform simultaneously to the recessed portions of the vehicle wheel 12 surrounding the openings 22 as well as the peripherally beveled faces of the lug nuts 24 and also further enhances the ability of the body to yield to contact with a stud 16 when extended through the opening 22.

The operation and use of the device 25 of the present invention may thus be understood. To prepare the wheel 12 for quick mounting to the wheel hub 14, a washer-like device 25 of the present invention is secured concentrically about each stud-receiving opening 22 in the wheel 12 by peeling the protective overlay 32 from one end of each device 25 and placing the exposed end face 30 of each device 25 in face-abutment with the region 23 of the outer surface of the wheel 12 about a respective opening 22 therein, whereby the adhesive on the end face 30 of each device 25 adheres to the wheel 12. Similarly, the lug nuts 24 are then adhered to the opposite faces 30 of the devices 25 after removing the other protective overlay 32 from each device 25 to expose the adhesive thereunder. The self-adhesive material on the opposite faces 30 of each device 25 securely, but removably, adhere to both the wheel 12 and the lug nuts 24 immediately, essentially eliminating any set-up time and, thus, once the simple operation of adhering the lug nuts 24 to the wheel 12 in the manner described has been completed, the wheel 12 is ready for immediate mounting onto the wheel hub 14.

Wheel mounting is accomplished by simply positioning the openings 22 in the wheel 12 in alignment with the respective studs 16 of the wheel hub 14 and then moving the wheel 12 laterally to extend the studs 16 through the openings 22, the aligned openings 28 in the respective adhesive devices 25 and the respectively adhered lug nuts 24. With the wheel 12 thusly placed on the studs 16 of the hub 14, the lug nuts 24 are disposed on the bullet-shaped nose portions 20 of the studs 16 and can be readily tightened in sequence onto the threaded shanks 18 using a conventional pneumatically-operated wrench (not shown). The axial expansibility of the adhesive devices 25 is important in that, as each of the lug nuts 24 is tightened in sequence onto the threaded shank 18 of its respective stud 16 necessarily causing the remaining studs 16 to protrude further through their aligned wheel openings 22 and into engagement with the respective adhesive devices 25, each annular body 26 will stretchably extend in response to such contact and thereby minimize any tendency or risk that the bond between the adhesive device 25 and either the wheel 12 or the lug nut 24 is dislodged.

Upon tightening of each lug nut 24, the resilient foam material of the associated adhesive device 25 yields and flattens to the force of securement of the lug nut 24 and is eventually obliterated and forced outwardly from between the lug nut 24 and the wheel 12. Therefore, the devices 25 do not interfere with the desired rigidity of the securement of the wheel 12 to the hub 14. Moreover, upon subsequent removal of the wheel and tire assembly 10,12 from the wheel hub 14, minimal if any residue from the devices remains on the lug nuts 24 and the wheel 12 so that cleaning is either unnecessary or can be relatively easily accomplished by application of an adhesive solvent such as acetone.

As will thus be understood, the washer-like annular devices 25 of the present invention greatly simplify and shorten the time required to premount lug nuts 24 to vehicle wheels 12 in preparation for an automobile race (or for that matter whenever it is desired to simplify and quicken the mounting of any vehicle wheel to a wheel hub) and equally simplifies and shortens the time required for cleaning the vehicle wheels after use. The present invention provides the additional advantage that an automobile wheel, when so prepared, is immediately ready for mounting directly onto an automobile wheel hub, without the conventional necessity of waiting for set-up of adhesives which are normally used.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. In particular, it will be readily understood that devices in accordance with the present invention may be produced in many various configurations for diverse uses in substantially any application wherein it would be advantageous to hold a nut or a like securement device in place while a bolt or other compatible fastener is connected thereto. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A device for adhering a lug nut to a vehicle wheel about a stud-receiving opening therein to facilitate mounting of the wheel to a stud on a wheel hub of a vehicle without necessitating manual placement of the lug nut on the stud, the device comprising an annular body defining an axial opening therethrough for alignment with the stud-receiving opening in the vehicle wheel, the annular body having self-adhesive surfaces at opposite ends thereof for adhesion of one end to the vehicle wheel about the stud-receiving opening and adhesion of the other end to the lug nut, the annular body being extensible in response to extension of the stud through the stud-receiving opening, thereby to remain adhered to the wheel and to the lug nut until securement of the lug nut to the stud.

2. A device according to claim 1 wherein the annular body is formed of a stretchable foam material.

3. A device according to claim 1 wherein the annular body has a pair of slits extending partially circumferentially about and radially through the body to enhance axial stretchability thereof.

4. A device according to claim 1 wherein the annular body is generally cylindrical and the axial opening is correspondingly cylindrical.

5. A vehicle wheel assembly particularly adapted for mounting to a vehicle wheel hub having a plurality of mounting studs without necessitating manual placement of lug nuts on the studs to secure the wheel assembly to the wheel hub, the wheel assembly comprising a wheel having a plurality of stud-receiving openings therein, a corresponding plurality of lug nuts mountable to the studs of the wheel hub, and a corresponding plurality of devices adhering the lug nuts to the wheel respectively about the stud-receiving openings therein, each device having an annular body defining an axial opening therethrough in alignment with the respective stud-receiving opening and self-adhesive surfaces at opposite ends of the annular body adhering one end to the vehicle wheel and the opposite end to the respective lug nut, the annular bodies being extensible in response to extension of the studs through the stud-receiving openings, thereby to remain adhered to the wheel and the lug nuts until securement of the lug nuts to the studs.

6. A vehicle wheel assembly according to claim 5 wherein each annular body is formed of a stretchable foam material.

7. A vehicle wheel assembly according to claim 5 wherein each annular body has a pair of slits extending partially circumferentially about and radially through the body to enhance axial stretchability thereof.

8. A vehicle wheel assembly according to claim 5 wherein each annular body is generally cylindrical and the axial opening is correspondingly cylindrical.

9. A device for adhering one fastener element to a mounting surface about a receiving opening therein to facilitate attachment of another compatible fastener element to the one fastener element upon extension of the another fastener element through the opening without necessitating manual placement of the one fastener element on the another fastener element, the device comprising an annular body defining an axial opening therethrough for alignment with the receiving opening in the mounting surface, the annular body having self-adhesive surfaces at opposite ends thereof for adhesion of one end to the mounting surface about the receiving opening and adhesion of the other end to the one fastener element, the annular body being extensible in response to extension of the another fastener element through the receiving opening, thereby to remain adhered to the mounting surface and to the one fastener element until securement of the one fastener element to the another fastener element.

10. A device according to claim 9 wherein the annular body is formed of a stretchable foam material.

11. A device according to claim 9 wherein the annular body has a pair of slits extending partially circumferentially about and radially through the body to enhance axial stretchability thereof.

12. A device according to claim 9 wherein the annular body is generally cylindrical and the axial opening is correspondingly cylindrical.

* * * * *